United States Patent [19]

Otani et al.

[11] Patent Number: 4,537,945
[45] Date of Patent: Aug. 27, 1985

[54] POLYETHER DERIVATIVE AND A POLY(URETHANE)UREAMIDE OBTAINED THEREFROM

[75] Inventors: Kozo Otani, Hyogo; Yoshio Yamada, Osaka, both of Japan

[73] Assignee: Toyo Tire & Rubber Company Limited, Osaka, Japan

[21] Appl. No.: 651,264

[22] Filed: Sep. 17, 1984

[30] Foreign Application Priority Data

Apr. 2, 1984 [JP] Japan .................................. 59-66599
Jun. 16, 1984 [JP] Japan ................................. 59-124019

[51] Int. Cl.³ ..................... C08G 18/32; C08G 18/60; C07C 101/00
[52] U.S. Cl. .................................... 528/68; 521/163; 560/19; 560/50
[58] Field of Search ...................... 528/68; 560/19, 50; 521/163

[56] References Cited

U.S. PATENT DOCUMENTS

| | | | |
|---|---|---|---|
| 3,123,631 | 3/1964 | Staiger et al. | 560/19 |
| 3,817,940 | 6/1974 | Blahak et al. | 528/68 |
| 3,932,360 | 1/1976 | Ceranowski et al. | 528/68 |
| 4,246,392 | 1/1981 | Koike et al. | 560/50 |
| 4,328,322 | 5/1982 | Baron | 528/68 |
| 4,476,318 | 10/1984 | Harada et al. | 560/50 |

Primary Examiner—Herbert S. Cockeram
Attorney, Agent, or Firm—Murray, Whisenhunt and Ferguson

[57] ABSTRACT

A poly(urethane)ureamide which comprises a polymer obtained by a reaction of (a) a polyether derivative of the general formula [I] and (b) a polyisocyanate exhibits an excellent wear resistance and heat resistance due to the presence of the aromatic amido groups

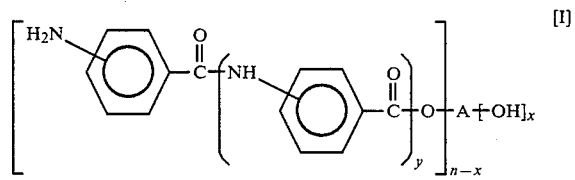

wherein
A is an n-valent radical obtained by removal of hydroxyl groups from an n-valent polyoxyalkylenepolyol having a molecular weight of 400 to 10,000,
n is an integer of 2 to 8,
x is an average value and a number of $0 \leq x < (n-1)$ and
y is an average value and a number of $0.05 \leq y < 1$.

8 Claims, No Drawings

POLYETHER DERIVATIVE AND A POLY(URETHANE)UREAMIDE OBTAINED THEREFROM

The invention relates to a polyether derivative having at least one terminal amino group and represented by the general formula [I], and a poly(urethane)ureamide which is obtained by a polyaddition reaction of the above polyether derivative and a polyisocyanate.

In a Japanese patent application No. 199,384/1982 filed previously by us are shown a polymer and its process which is prepared by the reaction of a polyetherpolyol derivative of the general formula

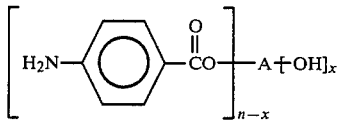

and a polyisocyanate, the obtained polyaddition polymer having an excellent heat resistance and mechanical strength due to the structure thereof.

Further, in Japanese patent application Nos. 165,447/1982 and 75,182/1983 filed previously by us are shown processes for preparing the polyetherpolyol derivative having the terminal amino group.

The present invention is an improvement of those shown in the above Japanese patent application Nos. 199,384/1982, 165,447/1982 and 75,182/1983.

A polyol derivative having amino and optionally hydroxyl groups in the ends of the molecule and further having aromatic amido groups adjacent to a part of terminal aminophenyl groups is reacted with a polyisocyanate to produce a poly(urethane)ureamide containing urea bonds and aromatic amido groups. This poly(urethane)ureamide has many excellent advantages compared with a polyurethane obtained from a polyol and a polyisocyanate.

Particularly, the poly(urethane)ureamide of the invention which is prepared by a polyaddition reaction of the polyol derivative having aromatic amido groups adjacent to a terminal aminophenyl group and a polyisocyanate has a higher heat resistance and a greater mechanical strength compared with a corresponding polyurethane.

U.S. Pat. No. 4,328,322 discloses a polymer which is prepared by a polyaddition reaction of a para-aminobenzoate of a polyol with a polyisocyanate, the para-aminobenzoate of the polyol being prepared by a reaction of a polyol with para-nitrobenzoyl chloride and a reduction of nitro groups to amino groups, and all of the terminal hydroxyl groups of the polyol are replaced by amino-containing groups. Further, in the same U.S. Patent is described a polymer which is prepared by a polyaddition reaction of a para-aminobenzoic amide of a polyamine with a polyisocyanate, the paraaminobenzoic amide of the polyamide being prepared by the reaction of a polyamine with para-nitrobenzoyl chloride or para-nitrobenzoic acid and the reduction of nitro groups to amino groups to replace all of the terminal amino groups of the polyamine by amino-containing groups.

The poly(urethane)ureamide of the invention is obtained by a polyaddition reaction of the polyether derivative and a polyisocyanate, the polyether derivative having terminal amino groups bonded to aromatic esteraromatic amido groups. Thus, the present polymer differs in chemical structure from the polymer disclosed in the above U.S. Pat. No. 4,328,322.

An object of the invention is to provide a polyether derivative having amino and optionally hydroxyl groups in the ends of the molecule and further having aromatic amido groups adjacent to a part of terminal aminophenyl groups.

Another object of the invention is to provide a poly(urethane)ureamide which is obtained by a polyaddition reaction of a polyisocyanate and a polyether derivative having amino and optionally hydroxyl groups in the ends of the molecule and further having aromatic amido groups adjacent to a part of terminal aminophenyl groups.

The present invention provides a polyether derivative and a process for preparing the same, the polyether derivative being represented by the general formula [I]

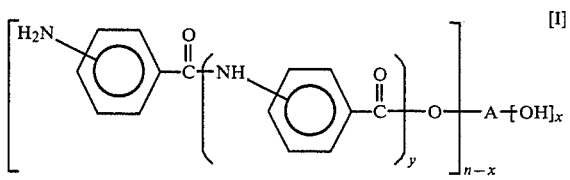

wherein
A is an n-valent radical obtained by removal of hydroxyl groups from an n-valent polyoxyalkylenepolyol having a molecular weight of 400 to 10,000,
n is an integer of 2 to 8,
x is an average value and a number of $0 \leq x < (n-1)$ and
y is an average value and a number of $0.05 \leq y < 1$.

The present invention also provides a poly(urethane)ureamide and a process for preparing the same, the poly(urethane)ureamide comprising a polymer obtained by a reaction of (a) the polyether derivative of the general formula [I] and (b) a polyisocyanate.

Further, the present invention provides a polymer comprising a product obtained from the reaction of the polyether derivative of the general formula [I], a chain extender and a polyisocyanate, and a process for preparing the same.

The polyether derivative used in the invention and having the general formula [I] is obtained with replacing a part or all of the terminal hydroxyl groups by aromatic amino groups which are adjacent to aromatic amido groups. The polyether derivative can be prepared by substantially single-stage process in a high yield without purification.

The polyether derivative used in the invention can be prepared by reacting a 2- to 8-valent polyoxyalkylenepolyol having a molecular weight of 400 to 10,000 with an aminobenzoic acid in the presence of an aliphatic alcohol.

Examples of preferable polyoxyalkylenepolyol include 2- to 8-valent polyetherpolyols having a molecular weight of 400 to 10,000. These polyols can be obtained by a known process. For example, these polyols are prepared by addition polymerization of at least one alkylene oxide such as ethylene oxide, propylene oxide, tetrahydrofuran, etc. in any order, in the presence of a suitable initiator such as water, low molecular weight polyol or amine, etc.

Examples of useful low molecular weight polyols as an initiator are ethylene glycol, propylene glycol, 1,4-butandiol, 1,6-hexanediol, glycerin, trimethylolpropane, pentaerythritol, sorbitol, sucrose, hydroquinone, 2,2-bis(4-hydroxyphenyl)propane, etc. Examples of useful low molecular weight amines are methylamine, butylamine, ethylenediamine, aniline, tolylenediamine, alkanolamines such as ethanolamine, diethanolamine, triethanolamine, etc.

Among the above polyoxyalkylenepolyols, preferable are 2- to 3-valent polyoxytetramethylene glycol, polyoxypropylenepolyol, polyoxypropylenepolyoxyethylenepolyol, etc having a molecular weight of 1,000 to 4,000, when the resulting polyether derivative having amino and optionally hydroxyl groups in the ends of the molecule and further having aromatic amido groups adjacent to a part of terminal aminophenyl groups is used as a starting material for an elastomer. Polyoxypropylenepolyol having 3 to 8 valency and a molecular weight of 400 to 1,500 is preferable, in case the resulting polyether derivative is used as a starting material for a plastics.

Aminobenzoic acids used in the invention may be any of ortho, meta or para-aminobenzoic acid. Paraaminobenzoic acid is particularly preferable when the polyether derivative of the invention is used as a starting material for an elastomer or plastics.

Various aliphatic alcohols can be used in the invention and preferable examples thereof are linear or cyclic monoalcohols having 1 to 8 carbon atoms such as methanol, ethanol, propanol, butanol, hexanol, octanol, cyclobutanol, cyclopentanol, cycloheptanol, etc, diols having 2 to 8 carbon atoms such as ethylene glycol, propanediol, butanediol, hexanediol, heptanediol, etc. Cellosolves such as 2-butoxyethanol, 2-ethoxyethanol, etc are also preferable.

In the invention, it is preferable to react one mole of the above n-valent polyoxyalkylenepolyol with 0.125n to 2n moles, preferably 0.5n to 2n moles of aminobenzoic acid in the presence of 0.125n to 30n equivalents of aliphatic alcohol.

A content of the aromatic amido group in the polyether derivative having the aromatic amido group adjacent to the terminal aminophenyl group can be determined quantitatively by NMR analysis and nitrogen elementary analysis.

Mechanism of formation of the aromatic amido group is not sufficiently clarified but is presumed as follows:

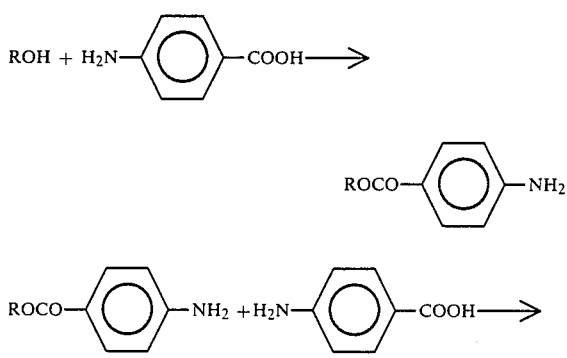

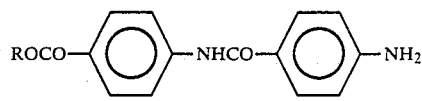

The polyether derivative obtained by the process of the invention may be either an ester in which all of the terminal hydroxyl groups are converted to amino-containing groups or a partial ester having unreacted hydroxyl groups. The polyether derivative has aromatic amido groups adjacent to a part of terminal aminophenyl groups. The esterification ratio, namely amine conversion ratio may be in a wide range depending on the use. It is essential that at least, on average, one hydroxyl group of the polyetherpolyol is subjected to esterification and the esterification ratio (amine conversion ratio) is preferably about 50 to 100%. A content of amido groups adjacent to aminophenyl groups is preferably 10 to 50% based on the terminal amino groups. With the above range of the amido groups, the polyether derivative has an adequate viscosity and the resulting polymer has an excellent amenability to molding.

The polyether derivative of the invention can be obtained by the reaction of the polyoxyalkylenepolyol and aminobenzoic acid in the presence of aliphatic alcohol with or without a known esterification catalyst. The reaction proceeds usually at 150° to 250° C., preferably in a stream of an inert gas such as nitrogen with removing water and alcohol. Weak acid or weak basic catalyst is preferable which does not produce an ether or olefin by dehydration of a polyol. Examples of useful catalysts are antimony trioxide, lead monoxide and like metal oxide, tetraisopropyl titanate, tetrabutyl titanate and like organic titanium compounds, calcium acetate and like alkaline earth metal salt of weak acids, among these most preferable being organic titanium compounds. The amount of catalyst is usually up to 1000 ppm. An inert solvent and antioxidant such as triphenyl phosphate may be usable in the reaction. The reaction is continued until the distillation of water is completed. In the above, a mixture of water and a excess of aliphatic alcohol may be removed without separation, or water may be removed after separated from alcohol. In the latter case, the separated alcohol may be recycled to the reaction. Further, the reaction is continued until the distillation of alcohol is completed. The polyether derivative is obtained without purification by removing from the reaction mixture the remaining alcohol and, if present, excess of aminobenzoic acid.

Any of polyisocyanates known in polyurethane chemistry is usable as a polyisocyanate of the invention. Example of useful polyisocyanates include hexamethylene diisocyanate, isophorone diisocyanate, 4,4'-dicyclohexylmethane diisocyanate, 2,4-tolylene diisocyanate(2,4-TDI), 2,6-tolylene diisocyanate(2,6-TDI), 4,4'-diphenylmethane diisocyanate(MDI), carbodiimide-modified MDI, polymethylenepolyphenyl isocyanate(PAPI), ortho-toluidine diisocyanate(TODI), naphthylene diisocyanate(NDI), xylylene diisocyanate (XDI), etc. These isocyanates are useful singly or in admixture of at least two of them.

The poly(urethane)ureamide of the invention can be prepared by any of processes known in polyurethane chemistry, by a polyaddition reaction of a polyisocyanate and the polyether derivative having amino and optionally hydroxyl groups in the ends of the molecule and further having aromatic amido groups adjacent to a part of terminal aminophenyl groups. For example, the polyaddition reaction may be conducted in the presence of an active hydrogen-containing compound which is capable of reacting with isocyanate group. Examples of the active hydrogen-containing compounds are a long-chain polyol, short-chain polyol, short-chain polyamine, water, etc. Further, any of known additives in polyurethane chemistry may be added such as a catalyst, fire retardant, plasticizer, filler, blowing agent, antioxidant, pigment, inert organic solvent, etc.

In case of the production of an elastomer in the invention, it is preferable to conduct the reaction in the presence of a suitable chain extender. The chain extender includes a 2- to 4-valent polyol having a molecular weight of up to 500, diamine having a primary or secondary terminal amino group and a molecular weight of up to 500. Preferable chain extenders are for example:
(a) ethylene glycol, diethylene glycol, propylene glycol, dipropylene glycol, butanediol, hexanediol, glycerin, trimethylolpropane, pentaerythritol, sorbitol, 1,4-cyclohexanediol, 1,4-cyclohexanedimethanol, xylylene glycol and like polyols
(b) hydrazine, ethylenediamine, tetramethylenediamine, hexamethylenediamine, 1,4-cyclohexanediamine, phenylenediamine, xylylenediamine, 2,4-tolylenediamine, 4,4'-diaminodiphenylmethane, 3,3'-dichloro-4,4'-diaminodiphenylmethane, 1,4-dichloro-3,5-diaminobenzene, 1,3-propanediol-di-para-aminobenzoate and like diamines
(c) ethanolamine, diethanolamine, triethanolamine, and like alkanolamines
(d) a polyol having a molecular weight of up to 500 and obtained by the addition of propylene oxide and/or ethylene oxide to the above polyols, diamines, alkanolamines or to hydroquinone, pyrogallol, 4,4'-isopropylidenediphenol or aniline, in any order.

Among the above, preferable are diamines which especially enhance the effect of the invention.

The polyaddition reaction of the polyether derivative and the polyisocyanate is preferably conducted under an isocyanate index of 95 to 120. The reaction is conducted in a similar manner in the presence of an another active hydrogen-containing compound. The polyether derivative is usually reacted with a molten polyisocyanate at room temperature or around a melting temperature of polyisocyanate. The reaction can be carried out at room temperature when using a polyisocyanate which is liquid at room temperature. In case of using a high molecular weight polyol, chain extender and/or blowing agent, these compounds are preferably dissolved in the polyether derivative prior to use. The reaction can be conducted by a prepolymer method. For example, a part or all of the polyether derivative is reacted with an excess of the polyisocyanate to prepare a prepolymer having a terminal isocyanate group, and then the prepolymer is reacted with the remaining polyether derivative and/or the chain extender. In this case, the prepolymer is preferably used as heated at more than 60° to 80° C. oras dissolved in an inert solvent, in order to decrease a viscosity and improve the handling thereof.

Further, in case of preparing an elastomer by casting the present polymer, a mold is preferably heated usually at 50° to 100° C. When obtaining a cellular plastic, the reaction is conducted in the presence of a blowing agent such as water, monochlorotrifluoromethane and like low boiling compounds.

The poly(urethane)ureamide of the invention has many advantages. The polymer obtained by the reaction of the polyether derivative and a polyisocyanate exhibits an excellent wear resistance and heat resistance due to the presence of the aromatic amido groups.

The invention will be described in detail with reference to the following Reference Examples, Examples and Comparison examples.

EXAMPLE 1

Into a four-necked flask were placed 3000 g (4.01 eq) of polyoxytetramethylene glycol (trade name, PTMG 1500, MW 1498, a product of Mitsubishi Chemical Industries Ltd.), 632 g (4.61 eq) of para-aminobenzoic acid (Reagent grade, a product of Nakarai Chemical Co., Ltd.), 520 g (3.99 eq.) of 2-ethyl-1-hexanol (octanol) and 0.6 g of tetrabutyl titanate. The mixture was heated under a stream of dry nitrogen gas. 2-Ethyl-1 hexanol began to reflux at 215° C. and water began to flow dropwise into an adapter fitted to a condenser at 219° C. A 73.5 g of water was removed by maintaining the mixture at 215° to 230° C. for 6 hours.

The mixture was heated at 200° to 210° C. at a reduced pressure of 17 to 110 mmHg and then at 220° to 240° C. at 2.5 to 3 mmHg to remove 2-ethyl-1-hexanol. A 2103 g of red brown liquid was obtained having a viscosity of 9500 cps at 27° C. Analysis of the liquid with gel permeation chromatography showed no free para-aminobenzoic acid and octyl para-aminobenzoate.

The liquid was confirmed to be a polyether derivative having terminal amino groups by the following method.

An amine value of the product was 1.082 meq/g by a titration with use of perchloric acid in glacial acetic acid according to Handbook of Japan Analytical Chemistry, third edition, page 261. A total amount of amino group and hydroxyl group was 1.169 meq/g by hydroxyl value measuring method (JIS K 1557). Analysis of the product with gel permeation chromatography showed no free para-aminobenzoic acid and octyl para-aminobenzoate. The product was identified by a single peak and the distribution of molecular weight is almost same as that of the starting PTMG 1500. Accordingly, 92.6% of terminal hydroxyl group of PTMG 1500 was converted to amino group.

The liquid was also confirmed to have amido group by $^{13}$C-N M R analysis. The amido group was present 11.5% based on the terminal amino group and nitrogen was 1.73% by elementary analysis. Separately, nitrogen based on the amino group was calculated to be 1.51% from the above amine value. The amido group was calculated to be 12.4% based on the terminal amino group, provided that a difference of nitrogen content by elementary analysis and that calculated from the amine value was nitrogen content based on the amido group. Although amido group contents were not coincident between those obtained from $^{13}$C-NMR analysis and elementary analysis, both methods showed the presence of amido group of at least 10%.

Reference Example 1

Into a three-necked flask were placed 1106 g (1.456 eq) of polyoxytetramethylene glycol (trade name, PTMG 1500, MW 1520, a product of Mitsubishi Chemical Industries Ltd.), 240 g (1.456 eq) of ethyl para-aminobenzoate (Reagent grade, a product of Nakarai Chemical Co., Ltd.) and 0.066 g of tetrabutyl titanate.

The mixture was heated under a stream of dry nitrogen gas. Ethanol began to be distilled at 180° C. The temperature was gradually increased and the distillation of ethanol stopped at 200° C. The mixture was further maintained at 215° C. for 3 hours. Unreacted ethyl para-aminobenzoate was distilled off under a reduced pressure to obtain 1255 g of a light yellow liquid having a viscosity of 6300 cps at 27° C.

An amine value of the product was 1.062 meq/g and a total amount of amino group and hydroxyl group was 1.173 meq/g by the same methods as in Example 1. Analysis of the product with gel permeation chromatography showed no free ethyl para-aminobenzoate. The product was identified by a single peak and the distribution of molecular weight is almost same as that of the starting PTMG 1500. Accordingly, 90.5% of terminal hydroxyl group of PTMG 1500 was converted to amino group.

The liquid contained no amido group by $^{13}$C-NMR analysis. Nitrogen was 1.48% by elementary analysis. Separately, nitrogen was 1.486% by calculation from amine value. Namely, nitrogen contents were coincident in both methods. It was presumed that amido group was not produced.

EXAMPLE 2

A 200 g (234 meq) quantity of the polyether derivative obtained in Example 1 was heated to 65° C. A 21.4 g (246 meq) quantity of 2,4-tolylene diisocyanate [2,4-TDI, Coronate T-100, a product of Nihon Polyurethane Co., Ltd.) was heated at 30° C. These two components were mixed together for 35 seconds in a propellor agitator. The mixture was degassed for one minute in a vacuum desiccator and then poured into an iron mold heated at 100° C. The pot life thereof was 9 minutes. The mold was placed in an oven of 110° C. for 2 hours. Then, a platy elastomer having a thickness of 2 mm was obtained after demolding and curing at 110° C. for 16 hours. The elastomer was aged at room temperature for 7 days and then properties thereof were measured according to JIS K 6301.

The aged platy elastomer was subjected to Taber abrasion test under the conditions of abrasion wheel of HS-22, load 1000 g and rotation 1000 r.p.m.

Further, samples in the form of disc having a diameter of 3 mm were made from the above aged platy elastomer. A softening point of the sample was measured with use of Thermal Mechanical Analysis (TMA, a product of Shimazu Seisakusho Ltd.) using nickel pin having a diameter of 0.5 mm under the conditions of load of 20 g and elevation rate of temperature of 5° C./min. The results were given in Table 1.

Comparison Example 1

A 200 g (212 meq) quantity of the polyether derivative obtained in Reference Example 1 was heated to 65° C. and 19.4 g (223 meq) of 2,4-tolylene diisocyanate [Coronate T-100] was heated to 30° C. These two components were mixed together for 35 seconds in a Propellor agitator.

The mixture was degassed for one minute in a vacuum desiccator and then poured into an iron mold heated at 100° C. The pot life thereof was 10 minutes.

A platy elastomer was prepared and tested in the same manner as in Example 2. Table 1 showed the results.

EXAMPLE 3

A 200 g (234 meq) quantity of the polyether derivative obtained in Example 1 was heated to 50° C. A 30.7 g (246 meq) quantity of 4,4'-diphenylmethane diisocyanate (MDI, Millionate MT, a product of Nihon Polyurethane Co., Ltd.) was melted at 50° C. These two components were mixed together for 30 seconds in a propellor agitator. The mixture was degassed for 80 seconds in a vacuum desiccator and then poured into an iron mold heated at 60° C. The pot life thereof was 7 minutes. The mold was placed in an oven of 110° C. for one hour. Then, a platy elastomer having a thickness of 2 mm was obtained after demolding and curing at 120° C. for 3 hours. The elastomer was aged at room temperature for 7 days and then properties thereof were measured in the same manner as in Example 2. The results were shown in Table 1.

Comparison Example 2

A 200 g (212 meq) quantity of the polyether derivative obtained in Reference Example 1 was heated to 50° C. and 27.8 g (223 meq) of 4,4'-diphenylmethane diisocyanate [Millionate MT] was melted at 50° C. These two components were mixed together for 30 seconds in a propellor agitator. The mixture was degassed for 80 seconds in a vacuum desiccator and then poured into an iron mold heated at 60° C. The pot life thereof was 7.5 minutes.

A platy elastomer was prepared and tested in the same manner as in Example 2. Table 1 showed the results.

EXAMPLE 4

To 150 g (175 meq) of the polyether derivative obtained in Example 1 was dissolved 11.7 g (88 meq) of 3,3'-dichloro-4,4'-diaminodiphenylmethane [Cureamine M T, a product of Ihara Chemical Co., Ltd.] at 65° C. An elastomer was prepared in the same manner as in Example 2 with use of the above solution and 24.0 g (276 meq) of 2,6-TDI heated at 35° C. The pot life thereof was 8 minutes. Table 2 showed the properties.

EXAMPLE 5

To 150 g (175 meq) of the polyether derivative obtained in Example 1 was dissolved 11.7 g (88 meq) of 3,3'-dichloro-4,4'-diaminodiphenylmethane at 50° C. An elastomer was prepared in the same manner as in Example 3 with use of the above solution and 34.5 g (276 meq) of molten MDI at 50° C. The pot life thereof was 5 minutes. Table 2 showed the properties.

TABLE 1

| Temp. | Item | Ex. 1 | Com. Ex. 1 | Ex. 2 | Com. Ex. 2 |
|---|---|---|---|---|---|
| 23° C. | Hardness JIS A | 68 | 64 | 83 | 81 |
|  | 100% Modulus (kg/cm$^2$) | 31 | 21 | 55 | 49 |
|  | Tensile strength (kg/cm$^2$) | 396 | 269 | 375 | 274 |
|  | Elongation (%) | 590 | 610 | 580 | 620 |
|  | Tear strength (kg/cm) | 64 | 45 | 85 | 69 |
| 70° C. or 120° C. | Tensile strength (kg/cm$^2$) | 70° C. 155 | 70° C. 85 | 120° C. 185 | 120° C. 167 |
|  | Elongation (%) | 780 | 920 | 590 | 670 |
| Taber abrasion weight loss (mg) |  | 1.5 | 6.4 | 3.4 | 9.8 |
| Softening point by TMA (°C.) |  | 167 | 153 | 185 | 171 |

TABLE 2

| Temp. | Item | Ex. 3 | Ex. 4 |
|---|---|---|---|
| 23° C. | Hardness JIS A | 88 | 87 |
|  | 100% Modulus (kg/cm$^2$) | 75 | 72 |
|  | Tensile strength (kg/cm$^2$) | 425 | 410 |
|  | Elongation (%) | 590 | 570 |
|  | Tear strength (kg/cm) | 108 | 98 |
| 120° C. | Tensile strength (kg/cm$^2$) | 280 | 195 |
|  | Elongation (%) | 600 | 560 |
| Taber abrasion weight loss (mg) |  | 12 | 20 |
| Softening point by TMA (°C.) |  | 198 | 185 |

EXAMPLE 6

Into a 1-liter, three-necked separable flask were placed 500 g (585 meq) of the polyether derivative obtained in Example 1, 103.3 g (136 meq) of polyoxytetramethylene glycol (PTMG 1500, MW 1520) and 125.5 g (1.422 eq) of 2,4-TDI. The mixture was heated under a stream of dry nitrogen gas at 90° C. for 4 hours with stirring to obtain a prepolymer of NCO content of 4.14%.

To 150 g (148 meq) of the prepolymer heated to 80° C. was added 18.7 g (140 meq) of molten 3,3'-dichloro-4,4'-diaminodiphenylmethane at 120° C. These two components were mixed together for 30 seconds. The mixture was degassed for 90 seconds and then poured into a mold heated at 80° C. The mixture was demolded after one hour and then heated in an oven at 110° C. for 16 hours to obtain an elastomer. Table 3 showed the properties of the elastomer after aged at room temperature for 7 days.

Comparison Example 3

Into a 1-liter, three-necked separable flask were placed 500 g (858 meq) of PTMG 1500 (MW 1520) and 115 g (1,316 eq) of 2,4-TDI. The mixture was heated under a stream of dry nitrogen gas at 90° C. for 4 hours with stirring to obtain a prepolymer of NCO content of 4.46%.

To 150 g (159 meq) of the prepolymer heated to 80° C. was added 20.2 g (151 meq) of molten 3,3'-dichloro-4,4'-diaminodiphenylmethane at 120° C. An elastomer was prepared in the same manner as in Example 6 with use of the mixture. Table 3 showed the properties of the elastomer.

EXAMPLE 7

To 100 g (98.6 meq) of the prepolymer of Example 5 was added 62 g (65.8 meq) of the prepolymer of Comparison Example 3. The mixture was heated at 80° C. and thereto was added 20.8 g (156 meq) of molten 3,3'-dichloro-4,4'-diaminodiphenylmethane at 120° C. An elastomer was prepared in the same manner as in Example 6 with use of the mixture. Table 3 showed the properties of the elastomer.

EXAMPLE 8

To 50 g (49.3 meq) of the prepolymer of Example 6 was added 100 g (106.2 meq) of the prepolymer of Comparison Example 3. The mixture was heated at 80° C. and thereto was added 19.8 g (148 meq) of molten 3,3'-dichloro-4,4'-diaminodiphenylmethane at 120° C. An elastomer was prepared in the same manner as in Example 6 with use of the mixture. Table 3 showed the properties of the elastomer.

TABLE 3

| Temp. | Item | Ex. 5 | Ex. 6 | Ex. 7 | Com. Ex. 3 |
|---|---|---|---|---|---|
| 23° C. | Hardness JIS A | 88 | 88 | 87 | 89 |
|  | 100% Modulus (kg/cm$^2$) | 95 | 82 | 75 | 84 |
|  | Tensile strength (kg/cm$^2$) | 560 | 502 | 521 | 385 |
|  | Elongation (%) | 460 | 470 | 500 | 440 |
|  | Tear strength (kg/cm) | 102 | 90 | 89 | 85 |
| 120° C. | Tensile strength (kg/cm$^2$) | 187 | 163 | 142 | 125 |
|  | Elongation (%) | 580 | 550 | 600 | 680 |
| Taber abrasion weight loss (mg) |  | 12 | 17 | 22 | 35 |
| A | Permanent Compression | 73 | 80 | 84 | 90 |
| B | Set (%) (JIS K 6301) | 86 | 90.5 | 94 | 100 |

A: 100° C. × 70 hours,
B: 120° C. × 24 hours

EXAMPLE 9

A prepolymer having NCO content of 4.43% was prepared in the same manner as in Comparison Example 3.

To 150 g (158 meq) of the prepolymer heated at 80° C. were added 38.5 (45 meq) of the polyether derivative of Example 1 and 15.1 g (113 meq) of molten 3,3'-dichloro-4,4'-diaminodiphenylmethane at 120° C. An elastomer was prepared in the same manner as in Example 6 with use of the mixture. Table 4 showed the properties of the elastomer.

Comparison Example 4

A 150 g (158 meq) quantity of the prepolymer having NCO content of 4.43% obtained in Example 9 was heated to 80° C. Thereto were added 42.4 g (45 meq) of the polyether derivative of Reference Example 1 and 15.1 g (113 meq) of molten 3,3'-dichloro-4,4'-diaminodiphenylmethane at 120° C. An elastomer was prepared in the same manner as in Example 6 with use of the mixture. Table 4 showed the properties of the elastomer.

TABLE 4

| Temp. | Item | Ex. 8 | Com. Ex. 4 |
|---|---|---|---|
| 23° C. | Hardness JIS A | 79 | 76 |
|  | 100% Modulus (kg/cm$^2$) | 51 | 40 |
|  | Tensile strength (kg/cm$^2$) | 332 | 245 |
|  | Elongation (%) | 530 | 550 |
|  | Tear strength (kg/cm) | 68 | 53 |
| 70° C. | Tensile strength (kg/cm$^2$) | 164 | 128 |
|  | Elongation (%) | 630 | 670 |
| Taber abrasion weight loss (mg) |  | 2.7 | 4.9 |
| Softening point by TMA (°C.) |  | 176 | 168 |

EXAMPLE 10

A polyether derivative was prepared in the same manner as in Example 1 with use of 1500 g (2.94 eq) of polyoxytetramethylene glycol (trade name, PTMG 1000, MW 1021, a product of Mitsubishi Chemical Industries Ltd.), 484 g (3.53 eq) of para-aminobenzoic acid, 766 g (5.88 eq) of 2-ethyl-1-hexanol and 0.69 g of tetrabutyl titanate. The product was a light yellow liquid having a viscosity of 5980 cps at 27° C. Yield was 1921 g. An amine value of the product was 1.453 meq/g and a total amount of amino group and hydroxyl group was 1,608 meq/g. Accordingly, 90.4% of terminal hydroxyl group of the polyoxyalkylenepolyol was converted to amino group. Contents of amido group were 13.2% based on $^{13}$C-NMR analysis and 14.3% based on nitrogen elementary analysis in the same manner as in Example 1.

A 200 g (322 meq) quantity of the polyether derivative was heated to 50° C. Thereto was added 42.3 g (338 meq) of molten MDI at 50° C. The mixture was degassed and then poured into an iron mold heated at 60° C. The pot life thereof was 8 minutes. The mixture was demolded after one hour and then heated in an oven at 110° C. for 16 hours to obtain an elastomer. Table 5 showed the properties of the elastomer after aged at room temperature for 7 days.

EXAMPLE 11

A polyether derivative was prepared in the same manner as in Example 1 with use of 1500 g (1.51 eq) of polyoxytetramethylene glycol (trade name, PTMG 2000, MW 1986, a product of Mitsubishi Chemical Industries Ltd.), 249 g (1.81 eq) of para-aminobenzoic acid, 393 (3.02 eq) of 2-ethyl-1-hexanol and 0.54 g of tetrabutyl titanate. The product was a light yellow liquid having a viscosity of 9800 cps at 27° C. Yield was 1699 g. An amine value of the product was 0.795 meq/g and a total amount of amino group and hydroxyl group was 0.927 meq/g. Accordingly, 85.8% of terminal hydroxyl group of the polyoxyalkylenepolyol was converted to amino group. Contents of amido group were 14.9% based on $^{13}$C-NMR analysis and 15.2% based on nitrogen elementary analysis in the same manner as in Example 1.

A 200 g (185 meq) quantity of the polyether derivative was heated to 50° C. Thereto was added 24.3 g (194 meq) of molten MDI at 50° C. The mixture was degassed and then poured into an iron mold heated at 60° C. The pot life thereof was 12 minutes. An elastomer was obtained in the same manner as in Example 10. The results were shown in Table 5.

EXAMPLE 12

A polyether derivative was prepared in the same manner as in Example 1 with use of 1500 g (1.52 eq) of polyoxypropylene glycol capped with ethylene oxide in the ends of the molecule (trade name, ED 56, MW 1980, a product of Mitsui Nisso Urethane Co., Ltd.), 272 g (1.98 eq) of para-aminobenzoic acid, 258 g (1.98 eq) of 2-ethyl-1-hexanol and 1.02 g of tetrabutyl titanate. The product was a yellow liquid having a viscosity of 2350 cps at 27° C. Yield was 1735 g. An amine value of the product was 0.787 meq/g and a total amount of amino group and hydroxyl group was 0.935 meq/g. Accordingly, 84.2% of terminal hydroxyl group of the polyoxyalkylenepolyol was converted to amino group. A content of amido group was 10.1% based on nitrogen elementary analysis in the same manner as in Example 1.

A 200 g (187 meq) quantity of the polyether derivative was heated to 50° C. Thereto was added 24.5 g (196 meq) of molten MDI at 50° C. The mixture was degassed and then poured into an iron mold heated at 50° C. The pot life thereof was 13 minutes. The mixture was demolded after one hour and then heated in an oven at 110° C. for 16 hours to obtain an elastomer. Table 5 showed the properties of the elastomer after aged at room temperature for 7 days.

TABLE 5

| Temp. | Item | Ex. 9 | Ex. 10 | Ex. 11 |
| --- | --- | --- | --- | --- |
| 23° C. | Hardness JIS A | 90 | 78 | 73 |
|  | 100% Modulus (kg/cm$^2$) | 70 | 35 | 32 |
|  | Tensile strength (kg/cm$^2$) | 433 | 394 | 232 |
|  | Elongation (%) | 560 | 700 | 680 |
|  | Tear strength (kg/cm) | 96 | 64 | 48 |
| 120° C. | Tensile strength (kg/cm$^2$) | 197 | 135 | 58 |

TABLE 5-continued

| Temp. | Item | Ex. 9 | Ex. 10 | Ex. 11 |
| --- | --- | --- | --- | --- |
|  | Elongation (%) | 600 | >800 | >800 |

We claim:

1. A polyether derivative of the formula

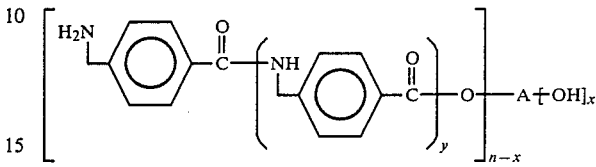

wherein

A is an n-valent radical obtained by removal of hydroxyl groups from an n-valent polyoxyalkylenepolyol having a molecular weight of 400 to 10,000, n is an integer of 2 to 8, x is an average value and a number of $0 \leq x < (n-1)$ and y is an average value and a number of $0.05 \leq y < 1$.

2. A process for preparing a polyether derivative of the formula

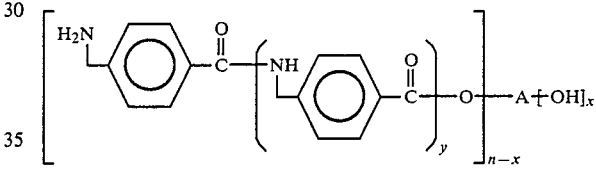

wherein

A is an n-valent radical obtained by removal of hydroxyl groups from an n-valent polyoxyalkylenepolyol having a molecular weight of 400 to 10,000, n is an integer of 2 to 8, x is an average value and a number of $0 \leq x < (n-1)$ and y is an average value and a number of $0.05 \leq y < 1$, which process comprises reacting one mole of an n-valent polyoxyalkylene polyol having a molecular weight of 400 to 10,000 with 0.125n to 2n moles of aminobenzoic acid in the presence of 0.125n to 30n equivalents of an aliphatic alcohol.

3. A polyether derivative prepared according to the process of claim 2.

4. A poly(urethane)ureamide which comprises a polymer obtained by a reaction of (a) a polyether derivative of the formula

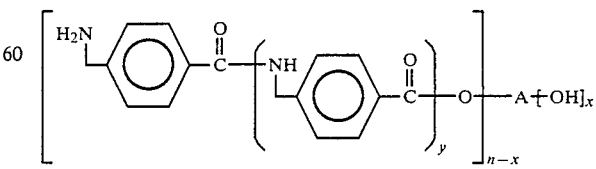

wherein

A is an n-valent radical obtained by removal of hydroxyl groups from an n-valent polyoxyalkylenepolyol having a molecular weight of 400 to 10,000, n is an integer of 2 to 8, x is an average value and a number of $0 \leq x < (n-1)$ and y is an average value and a number of $0.05 \leq y < 1$, and (b) a polyisocyanate.

5. A poly(urethane)ureamide as claimed in claim 4 which is obtained by further reacting a chain extender having a molecular weight up to 400.

6. A process for preparing a poly(urethane)ureamide as defined in claim 4, which process comprises reacting one mole of an n-valent polyoxyalkylenepolyol having a molecular weight of 400 to 10,000 with 0.125n to 2n moles of aminobenzoic acid in the presence of 0.125n to 30n equivalents of an aliphatic alcohol to obtain a polyether derivative of the general formula

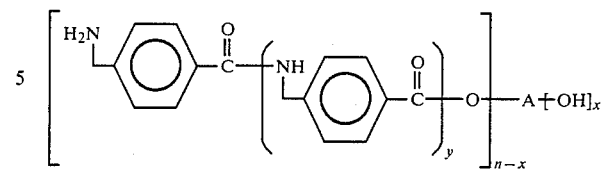

wherein

A is an n-valent radical obtained by removal of hydroxyl groups from an n-valent polyoxyalkylenepolyol having a molecular weight of 400 to 10,000, n is an integer of 2 to 8, x is an average value and a number of $0 \leq x < (n-1)$ and y is an average value and a number of $0.05 \leq y < 1$, and reacting said polyether derivative with a polyisocyanate.

7. A process as claimed in claim 6 wherein a chain extender having a molecular weight up to 400 is further reacted.

8. A poly(urethane)ureamide prepared according to the process of claim 6.

* * * * *